Patented Dec. 12, 1933

1,938,730

UNITED STATES PATENT OFFICE 1,938,730

RUBBER-LIKE MASS CONTAINING STYROL POLYMERIZATES

Eduard Tschunkur and Walter Bock, Cologne-Mulheim, Germany, assignors to I. G. Farbenindustrie Aktiengesellschaft, Frankfort-on-the-Main, Germany, a corporation of Germany No Drawing. Application July 10, 1930, Serial No. 467,126, and in Germany July 20, 1929

11 Claims. (Cl. 106—23)

The present invention relates to a process of manufacturing mixed rubber like masses, to a process of vulcanizing these masses and to the vulcanizates obtainable by said vulcanizing process.

The process of manufacture of the mixed rubber like masses is effected by incorporating and effecting complete interpenetration of the polymerization product of a butadiene hydrocarbon, more particularly of a hydrocarbon of the probable formula.

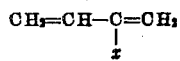

wherein $x$ means hydrogen or methyl, with a polymerization product of an olefine benzene, such as styrol, alpha-alkyl-styrols

nuclear homologues of styrol, polyvinylbenzenes and the like (hereinafter alluded to as "polymerizable styrol compounds"). The incorporating and effecting complete interpenetration of the butadiene hydrocarbon and olefine benzene polymerizate is best effected by mixing the different hydrocarbons and causing polymerization of the mixture either by simple heating, for example, to about 40–80° C., or in emulsion with water and an emulsifying agent or an emulsoid colloid, preferably while gently heating the emulsion to about 30–70° C. with shaking or stirring. It will also be possible to intimately mix unfinished polymerizates derived from butadiene hydrocarbons with unfinished polymerizates derived from olefine benzenes, which polymerizates should still possess a somewhat viscous character, by mechanical means and causing further polymerization of the mixtures according to one of the processes above mentioned with or without the addition of a butadiene hydrocarbon and/or an olefine benzene hydrocarbon. Obviously our mixed polymerizates can also be obtained by at first partially polymerizing a butadiene hydrocarbon, then adding an olefine benzene hydrocarbon and further polymerizing according to one of the methods described above or vice versa.

It may be mentioned that when applying in the claims the expression "incorporating and effecting complete interpenetration of a heat or emulsion polymerizate derived from a compound of the probable formula

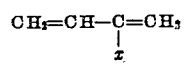

wherein $x$ stands for hydrogen or methyl, with a heat or emulsion polymerizate of an olefine benzene," this expression is intended to include all the processes defined above. Obviously also such processes are within the scope of this expression in which ingredients are employed which are known to favorably influence the polymerization processes in question, such as oxygen, substances being able to split off oxygen, metal oxides, electrolytes and the like.

It may further be mentioned that our mixed polymerizates should not be prepared by mechanically mixing the finished polymerizates of a butadiene hydrocarbon and of an olefine benzene hydrocarbon since rather unsatisfactory results are obtained in this case.

The proportion between the different hydrocarbons or the unfinished polymerizates should be such, that the mixed finished polymerizate contains below about 45% by weight of the olefine benzene polymerizate. The best results generally are obtained when applying the olefine benzene in such an amount that the mixed polymerizate contains between about 15–40% by weight of the olefine benzene polymerizate.

Instead of the pure butadiene hydrocarbons or pure olefine benzenes the cheaper technical raw products or mixtures of butadiene with isoprene and/or mixtures of different olefine benzenes or unfinished polymerizates of these products may be applied in many cases with good results.

It will also be advantageous in some cases to add before or during polymerization rather small amounts of other diolefine hydrocarbons, such as 2.3-dimethyl-butadiene, phenyl butadiene or the like, by which additions the character of the final products can be altered to a certain extent.

The mixed polymerizates thus obtainable are good plastic and easily workable on rollers and yield vulcanizates of high technical value, especially when vulcanized after the addition of a suitable soot variety.

It may be mentioned that the mechanical properties of the vulcanizates generally are superior to those of vulcanizates obtainable from the corresponding butadiene or isoprene polymerizate not containing an olefine benzene polymerizate. This is surprising inasmuch as the olefine benzene polymerizates in question possess a hard resin like character and furthermore, in view of the fact that an amelioration of the mechanical properties by the presence of an olefine benzene polymerizate cannot be observed in cases in which instead of a heat or emulsion polymerizate of butadiene or isoprene a sodium polymerizate of these hydrocarbons is employed.

As mentioned above our new mixed polymerizates are plastic and easily workable on rollers in consequence of which fact they easily take up fillers, such as soot, colloidal silicic acid, aluminium oxide, zinc oxide and the like, vulcanizing agents, such as sulfur, selenium, etc. vulcanization accelerators, plasticizing agents, dyestuffs and other ingredients usually applied in vulcanization processes.

By vulcanizing mixtures of our new mixed polymerizates after having incorporated therewith about 20–70% their weight of a suitable soot variety, such as carbon black, oil soot and the like, and in addition, sulfur in an amount between about 0, 5–5% by weight of the butadiene hydrocarbon/olefine benzene hydrocarbon polymerizate mixture and if desired other ingredients as defined above, vulcanizates are obtainable which generally will possess a tensile strength between about 180–350 kg./sqcm. at a stretch between about 500–800%.

The vulcanization process may be performed by heating the vulcanization mixture to a suitable temperature, for example, to a temperature between about 100–150° C., the time of vulcanization obviously being dependent on the fact whether a vulcanization accelerator and what kind of accelerator has been employed.

The following examples illustrate our invention without limiting it thereto, the parts being by weight.

Example 1.—100 parts of butadiene are mixed with 50 parts of styrol, the mixture is emulsified by means of a solution of 15 parts of an emulsifying agent (for example, sodium stearate, sodium mono- or dialkylnaphthalene sulfonate, with or without the addition of colloids, salts and the like) in 150 parts of water and polymerized, with or without agitation. After a few days an artificial latex is obtained, which after working up gives a good yield of a plastic, easily rolled, mixed polymerization product, which is converted by suitable vulcanization into a valuable vulcanization product possessing the properties of soft rubber.

When using in this example a mixture of 130 parts of butadiene with 20 parts of styrol a mixed polymerizate is obtained possessing after vulcanization with the addition of lamp black especially high elasticity.

Example 2.—The plastic polymerization product obtained according to Example 1 is worked up, for example, by rolling with 3% of sulfur, 15% of zinc oxide, 2% of tar, 2% of stearic acid, 50% of lamp black or soot and 1% of thiocarbanilide and by vulcanizing in an appropriate manner at 2.5–3 atmospheres pressure yields a soft rubber vulcanization product of high value, which possesses for example, a breaking strength of 200–250 kgs. per sqcm. at an extensibility of 600–700% and an elasticity of 30–35%.

Example 3.—A styrol isoprene rubber produced according to the directions given in Examples 1 and 2 from 113 parts of isoprene and 37 parts of styrol shows after vulcanizing in a similar manner, for example, a breaking strength of 200–250 kgs. per sqcm. at an extensibility of 700–800% and an elasticity of 28–30%.

The proportion of the mixture between the artificial varieties of rubber and the polymerization products from olefine benzenes and cyclic diolefines as well as the quantities of lamp black or soot added for the purpose can vary within wide limits. Furthermore, all customary filling agents of an inorganic or organic nature, plasticizing agents and vulcanization accelerators, can be employed conjointly with the lamp black or soot and the vulcanization can likewise be carried out with other known agents instead of sulfur.

Example 4.—120 parts of butadiene 30 parts of styrol are emulsified in 150 parts of water with 7.5 parts of glue and 7.5 parts of the potassium salt of mono- or di-isobutyl-naphthalene-sulfonic acid. The mixture is then polymerized while stirring or at rest at a temperature of about 50–60° C. After a few days a mixed polymerizate separates for the most part in a solid form possessing high grade rubber-like properties.

Rubber-like masses of good quality may be likewise obtained, by polymerizing according to the above mentioned method, a mixture of 110 parts of butadiene, 20 parts of 2.3-dimethylbutadiene and 20 parts of styrol or a mixture of 113 parts of isoprene and 37 parts of styrol.

Example 5.—120 parts of butadiene and 30 parts of styrol are emulsified with 120 parts of water, 7 parts of the hydrochloric acid salt of diethylamino-ethyl-oleylamide and 30 parts of acetic acid of 30% strength. This mixture is polymerized for a few days at a temperature of 40–60° C. A latex-like emulsion yielding after coagulation a plastic rubber-like mass of high-grade soft rubber properties is thus obtained.

Example 6.—50 parts of butadiene are emulsified with 15 parts of α-methylstyrol, 6 parts of the chlorohydrate of diethylaminoethyloleylamide, 60 parts of water and the mixture is caused to polymerize while shaking or stirring at a temperature of about 60° C. for 4–5 days. The polymerizate formed is isolated in the usual manner and thus obtained in yield of about 85% of the theoretical amount.

90 parts of the polymerizate thus obtained are mixed by rolling or kneading with 45 parts of carbon black, 13.5 parts of zinc oxide, 1.8 parts of stearic acid, 0.9 part of sulfur, 1.6 parts of a vulcanization accelerator and the mixture is vulcanized at 3 atm. for 140 minutes. A vulcanizate is thus obtained possessing a tensile strength of 211 kg./sqcm. at a stretch of 500% an elasticity of 41%.

We claim:—

1. The process which comprises incorporating within a mixed rubber-like mass obtained by effecting complete interpenetration of a polymerizate derived from a compound of the probable formula:—

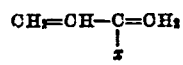

wherein $x$ stands for hydrogen or methyl, with a polymerizate derived from a polymerizable styrol compound in such a manner that the mixed polymerizate contains below about 45% by weight of the said styrol polymerizate, a vulcanizing agent and a finely divided soot variety in an amount between about 20 and about 70% by weight of the mixed rubber-like mass employed, and vulcanizing the mixture.

2. The process which comprises incorporating within a mixed rubber-like mass obtained by effecting complete interpenetration of a polymerizate derived by simple heating from a compound of the probable formula:—

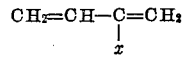

wherein $x$ stands for hydrogen or methyl, with a polymerizate derived by simple heating from a polymerizable styrol compound in such a manner that the mixed polymerizate contains below about 45% by weight of the said styrol polymerizate, a vulcanizing agent, and a finely divided soot variety in an amount between about 20 and about 70% by weight of the mixed rubber-like mass employed, and vulcanizing the mixture.

3. The process which comprises incorporating within a mixed rubber-like mass obtained by effecting complete interpenetration of an emulsion polymerizate derived from a compound of the probable formula:—

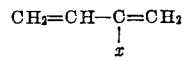

wherein $x$ stands for hydrogen or methyl, with an emulsion polymerizate derived from a polymerizable styrol compound in such a manner that the mixed polymerizate contains below about 45% by weight of the said styrol polymerizate, sulfur in an amount between about 0.5 and about 5% by weight of the mixed polymerizate employed and carbon black in an amount between about 20 and about 70% by weight of the mixed polymerizate employed, and vulcanizing the mixture.

4. The process which comprises incorporating within a mixed rubber-like mass obtained by effecting complete interpenetration of an emulsion polymerizate derived from a compound of the probable formula:—

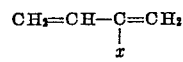

wherein $x$ stands for hydrogen or methyl, with an emulsion polymerizate derived from a polymerizable styrol compound in such a manner that the mixed polymerizate contains between about 15 and about 40% by weight of the said styrol polymerizate, sulfur in an amount between about 0.5 and about 5% by weight of the mixed polymerizate employed and carbon black in an amount between about 20 and about 70% by weight of the mixed polymerizate employed and vulcanizing the mixture.

5. The process which comprises incorporating within a mixed rubber-like mass obtained by effecting complete interpenetration of an emulsion polymerizate derived from a compound of the probable formula:—

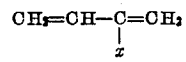

wherein $x$ stands for hydrogen or methyl with an emulsion polymerizate derived from styrol, in such a manner that the mixed polymerizate contains below about 45% by weight of the styrol polymerizate, sulfur in an amount between about 0.5 and about 5% by weight of the mixed polymerizate employed and carbon black in an amount between about 20 and about 70% by weight of the mixed polymerizate employed and vulcanizing the mixture.

6. The process which comprises incorporating within a mixed rubber-like mass obtained by effecting complete interpenetration of an emulsion polymerizate derived from a compound of the probable formula:—

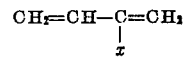

wherein $x$ stands for hydrogen or methyl, with an emulsion polymerizate derived from styrol, in such a manner that the mixed polymerizate contains between about 15 and about 40% by weight of the styrol polymerizate, sulfur in an amount between about 0.5 and about 5% by weight of the mixed polymerizate employed and carbon black in an amount between about 20 and about 70% by weight of the mixed polymerizate employed, and vulcanizing the mixture.

7. The vulcanizates being obtainable in accordance with the process of claim 1, said vulcanizates possessing highly advantageous technical properties.

8. The new vulcanizates being obtainable in accordance with the process of claim 3, said vulcanizates generally possessing a tensile strength between about 180–350 kg./sqcm. at a stretch between about 500–800%.

9. The new vulcanizates being obtainable in accordance with the process of claim 4, said vulcanizates generally possessing a tensile strength between about 180–350 kg./sqcm. at a stretch between about 500–800%.

10. The new vulcanizates being obtainable in accordance with the process of claim 5, said vulcanizates generally possessing a tensile strength between about 180–350 kg./sqcm. at a stretch between about 500–800%.

11. The new vulcanizates being obtainable in accordance with the process of claim 6, said vulcanizates generally possessing a tensile strength between about 180–350 kg./sqcm. at a stretch between about 500–800%.

EDUARD TSCHUNKUR.
WALTER BOCK.